US009616836B2

(12) United States Patent
Le et al.

(10) Patent No.: US 9,616,836 B2
(45) Date of Patent: Apr. 11, 2017

(54) TWO DIMENSIONAL PEDESTRIAN IMPACT SENSING (71) Applicant: Ford Global Technologies, LLC, Dearborn, MI (US)

(72) Inventors: Jialiang Le, Canton, MI (US); Hubert Szawarski, Waterford, MI (US); Manoharprasad K. Rao, Novi, MI (US); Yeruva Satya Reddy, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/605,167

(22) Filed: Jan. 26, 2015

(65) Prior Publication Data

US 2016/0214555 A1 Jul. 28, 2016

(51) Int. Cl.
G01M 17/00 (2006.01)
G06F 7/00 (2006.01)
G06F 19/00 (2011.01)
B60R 21/0136 (2006.01)
B60R 19/48 (2006.01)

(52) U.S. Cl.
CPC ........ B60R 21/0136 (2013.01); B60R 19/483 (2013.01)

(58) Field of Classification Search
CPC ..... G07C 5/0808; B60T 17/221; F02D 41/22; F02D 41/221; G01R 31/007
USPC ....................................................... 701/34.4
See application file for complete search history.

(56) References Cited

U.S. PATENT DOCUMENTS

| 7,303,041 | B2 | 12/2007 | Stuve |
| 7,488,015 | B2 | 2/2009 | Lu et al. |
| 2004/0210367 | A1* | 10/2004 | Takafuji ................. B60R 19/48 701/45 |
| 2009/0276125 | A1 | 11/2009 | Brandmeier et al. |
| 2011/0015829 | A1 | 1/2011 | Mack et al. |

FOREIGN PATENT DOCUMENTS

DE 2011086006 5/2013

OTHER PUBLICATIONS

Dargie, "Analysis of Time and Frequency Domain Features of Accelerometer Measurements", IEEE Explore Abstract (2 pages), Published in Computer Communications and Networks, 2009, ICCCN 2009, Proceedings of 18th International Conference, Aug. 3-6, 2009.

* cited by examiner

Primary Examiner — Maceeh Anwari
(74) Attorney, Agent, or Firm — Frank A. MacKenzie; Bejin Bieneman PLC (57) ABSTRACT A vehicle system includes a sensor that outputs an impact signal and a processing device that is programmed to calculate an acceleration envelope from the impact signal, determine a number of times the impact signal crosses a predetermined threshold, and determine whether the impact signal represents a pedestrian impact. Whether the impact is a pedestrian impact is based at least in part on the acceleration envelope and the number of times the impact signal crosses the predetermined threshold.

19 Claims, 5 Drawing Sheets

TWO DIMENSIONAL PEDESTRIAN IMPACT SENSING

BACKGROUND

More and more automobiles are being equipped with pedestrian protection systems. Such systems seek to reduce the risk of injury to pedestrians hit by vehicles. Regulatory bodies and performance assessment organizations consider the risk of injury to pedestrians during impacts when evaluating vehicles. Moreover, both regulatory bodies and performance assessment organizations consider reducing pedestrian injuries a top priority.

DETAILED DESCRIPTION

When an impact with a pedestrian cannot be avoided, a host vehicle may include a system that detects the impact with the pedestrian and initiates a countermeasure to attempt to reduce the risk of injuring the pedestrian. The system may include a sensor that outputs an impact signal and a processing device that is programmed to calculate an acceleration envelope from the impact signal. The processing device is further programmed to determine a number of times the impact signal crosses a predetermined threshold. For example, a metal bumper may resonate upon impact with certain objects. Impacts with different objects may affect the way the bumper resonates. An impact with a certain type of non-pedestrian subjects may cause the bumper to resonate more than an impact with a pedestrian. The resonations of the metal bumper may be reflected in the impact signal, and in particular, may cause the impact signal to cross a threshold a number of times. Accordingly, with the acceleration envelope and the number of times the impact signal has crossed the predetermined threshold, the processing device can determine whether the impact signal represents a pedestrian impact. If a pedestrian impact is detected, the processing device may output a control signal to deploy a pedestrian protection countermeasure.

The elements shown may take many different forms and include multiple and/or alternate components and facilities. The example components illustrated are not intended to be limiting. Indeed, additional or alternative components and/or implementations may be used.

Figure 1:
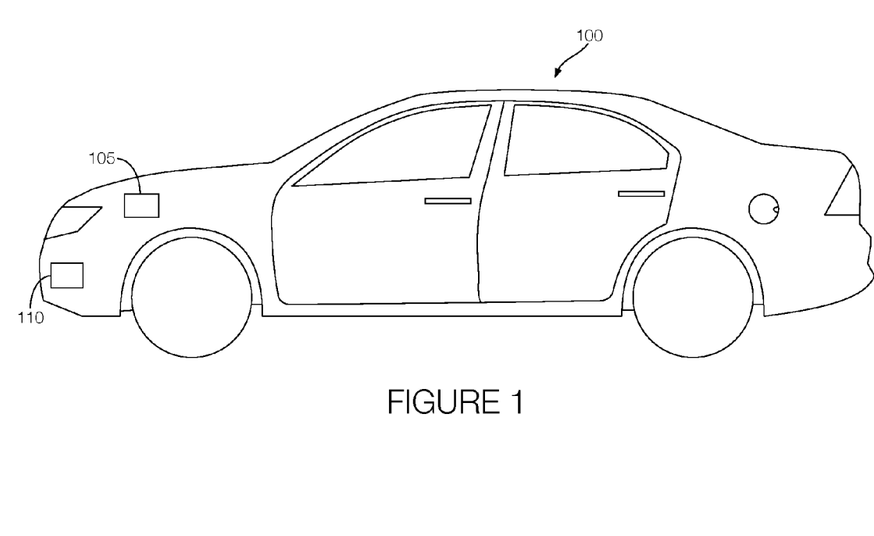
FIG. 1 illustrates an example host vehicle with a detection system for detecting an impact with a pedestrian and taking an appropriate countermeasure.

As illustrated in FIG. 1, the host vehicle 100 includes a pedestrian protection system 105 and a detection system 110 for detecting impacts involving pedestrians. During a collision, the detection system 110 may determine whether a pedestrian is likely involved. If so, the detection system 110 may output a control signal to the pedestrian protection system 105 so that pedestrian protection countermeasures may be taken. Examples of pedestrian protection countermeasures may include popping up a hood or deploying an externally mounted airbag to cushion the impact with the pedestrian. Accordingly, the pedestrian protection system 105 may include a pop-up hood, external airbags, or both. The pedestrian protection system 105 may be configured to deploy the pedestrian protection countermeasures in response to receiving the control signal generated by the detection system 110.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode.

Figure 2:
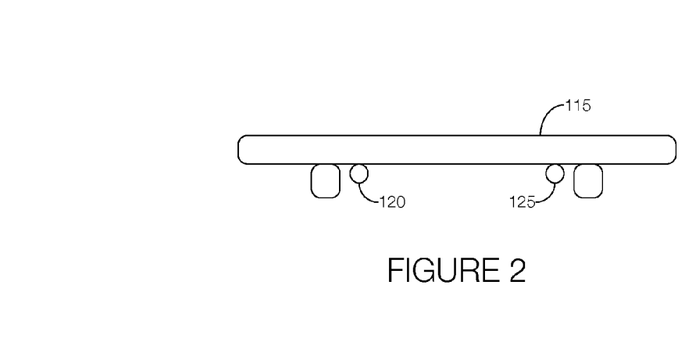
FIG. 2 is a schematic view of a bumper incorporated into the host vehicle of FIG. 1 and sensors mounted to the bumper.

FIG. 2 illustrates a schematic view of a bumper 115 that may be incorporated into the host vehicle 100. The bumper 115 may be formed from a metal material such as steel. A first sensor 120 and a second sensor 125 may be mounted to, or otherwise disposed on, the bumper 115. The first and second sensors 120, 125 may be configured to detect an impact with an object. When an object hits the bumper 115, both the first sensor 120 and the second sensor 125 may each be configured to output impact signals—a first impact signal and a second impact signal, respectively. The first impact signal and the second impact signal may each represent a profile associated with the impact detected. As discussed in greater detail below, the detection system 110, which may include the first sensor 120 and the second sensor 125, may process the first and second impact signals to determine whether the object is a pedestrian. If so, appropriate pedestrian protection countermeasures may be taken. The first and second sensors, 120, 125 may be accelerometers programmed or configured to output acceleration signals.

Figure 3:
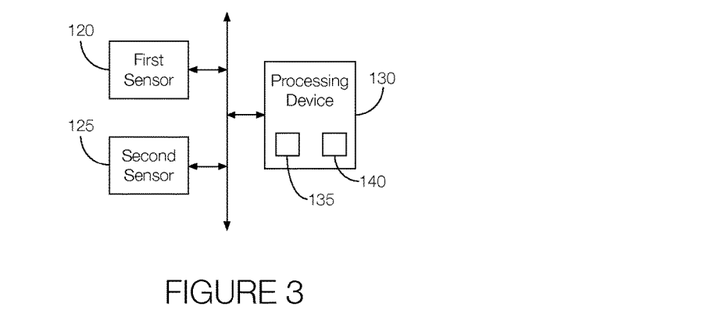
FIG. 3 is a block diagram showing example components of the system incorporated into the host vehicle of FIG. 1.

Referring now to FIG. 3, the detection system 110 may include the first sensor 120 and the second sensor 125, discussed above. The detection system 110 may further include a processing device 130. The processing device 130 may be configured to receive the first and second impact signals from the first and second sensors 120, 125, respectively. The processing device 130 may be further programmed to calculate an acceleration envelope from the impact signal. The acceleration envelope, AAE, may be defined as:

$$AAE_{WAD} = \max(\mathrm{abs}(S1), \mathrm{abs}(S2)) \qquad (1)$$

where S1 and S2 represent the first impact signal and the second impact signal, respectively, and where WAD represents the "window active duration". The window active duration may define a time window during which both the first sensor 120 and second sensor 125 are sampled.

The processing device 130 may be further programmed to determine how many times the impact signal crosses a predetermined threshold during the window active duration. The predetermined threshold may be based on an impact profile of a pedestrian-related impact, a non-pedestrian related impact, or both. In some instances, the predetermined threshold may be, e.g., zero. Therefore, the processing device 130 may include a software or hardware-based zero crossing counter 135 to count the number of times the impact signal crosses, e.g., zero. The zero crossing counter 135 may be programmed to output a signal representing the number of times the impact signal output by the first sensor 120, the second sensor 125, or both, crosses zero within the window active duration (i.e., a zero crossing time window). In one possible implementation, the zero crossing counter 135 may independently count the zero crossings from the impact signal output by the first sensor 120 and the zero crossings from the impact signal output by the second sensor 125. After counting the respective zero crossings, the zero crossing counter 135 or the processing device 130 may sum the number of zero crossings counted.

With the number of zero crossings and the acceleration envelope, the processing device 130 may be programmed to determine whether the impact signal represents a pedestrian or non-pedestrian impact. Moreover, the processing device 130 may be programmed to determine the type of non-human object involved. In some implementations, the processing device 130 may be programmed to detect certain types of non-human objects from the acceleration envelope. The processing device 130, however, may not be able to distinguish some non-human objects from humans based on the acceleration envelope alone. In such instances, the processing device 130 may use the number of times the impact signal crosses the predetermined threshold to identify whether the impact involved a human or non-human. In general, impacts with pedestrians may include fewer zero crossings than impacts with a certain type of non-human objects. If a pedestrian impact is detected, the processing device 130 may be programmed to output a control signal to deploy a pedestrian protection countermeasure, as discussed above. Other countermeasures may be taken if the impact does not involve a pedestrian.

Figure 4:
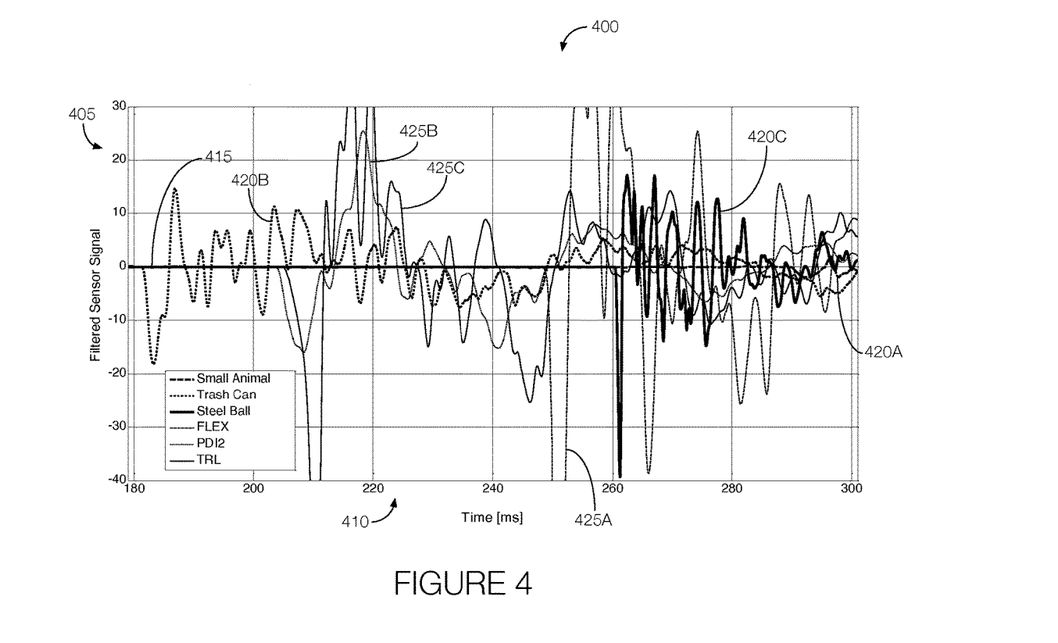
FIG. 4 illustrates a graph of example impact profiles for pedestrian and non-pedestrian related impacts.

FIG. 4 illustrates a graph 400 of example impact profiles for pedestrian and non-pedestrian related impacts. The y-axis 405 represents the magnitude of the impact signals output by the first sensor 120, second sensor 125, or both. The x-axis 410 represents time. The line 415 represents the predetermined threshold. The lines 420A-420C may represent the impact signals for non-human objects such as a small animal, trashcan, or steel ball. The lines 425A-425C may represent the impact signals for pedestrians, represented by the lines labeled FLEX, PDI, and TRL in the Figure. The impact starting point for various impacts signals shown in FIG. 4 is not standardized as can be observed from the starting point of different lines. As shown in the example graph 400 of FIG. 4, the lines 425A-C representing the pedestrian impacts cross the predetermined threshold (e.g., zero) fewer times than the line 420C representing impacts with a certain type of non-human objects. Thus, by counting the number of crossing for a pre-selected time window, such as 15 ms from the time of impact, some impacts with non-pedestrian objects such as impacts with, e.g., steel balls can be distinguished from impacts with pedestrian impacts. Accordingly, using a zero crossing analysis, the detection system 110 may only initiate the pedestrian protection countermeasure via the pedestrian protection system 105 in response to detecting the impact with the pedestrian.

Figure 5:
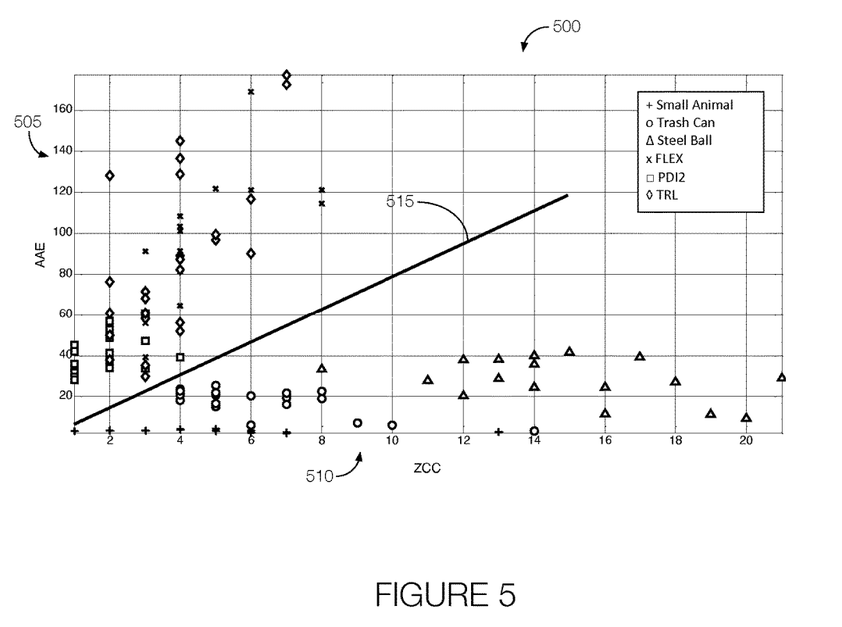
FIG. 5 illustrates a graph of a discrimination hyperplane that may be used to distinguish pedestrian and non-pedestrian related impacts.

FIG. 5 illustrates a graph 500 of a discrimination hyperplane that may be used to distinguish pedestrian and non-pedestrian related impacts. The discrimination hyperplane may be a function of zero crossings, velocity, or both. The effect of velocity on the discrimination hyperplane may be minimal, and possibly ignored, in some circumstances. As shown, the y-axis 505 represents the acceleration envelope and the x-axis 510 represents the number of times the impact signal crossed the predetermined threshold (e.g., zero). The discrimination hyperplane, shown by line 515, may separate impacts with humans from impacts with non-human objects. That is, when the acceleration envelope is related to the number of times the impact signal crossed the predetermined threshold, values that exceed the discrimination hyperplane may represent impacts involving pedestrians while values below the discrimination hyperplane may represent impacts involving non-human objects. The graph 500 may be used to define the discrimination hyperplane. With the discrimination hyperplane defined, the processing device 130 may compare the acceleration envelope and number of times the impact signal crosses the predetermined threshold to determine whether the impact signals received from the first sensor 120, the second sensor 125, or both represent pedestrian-related impacts.

Figure 6:
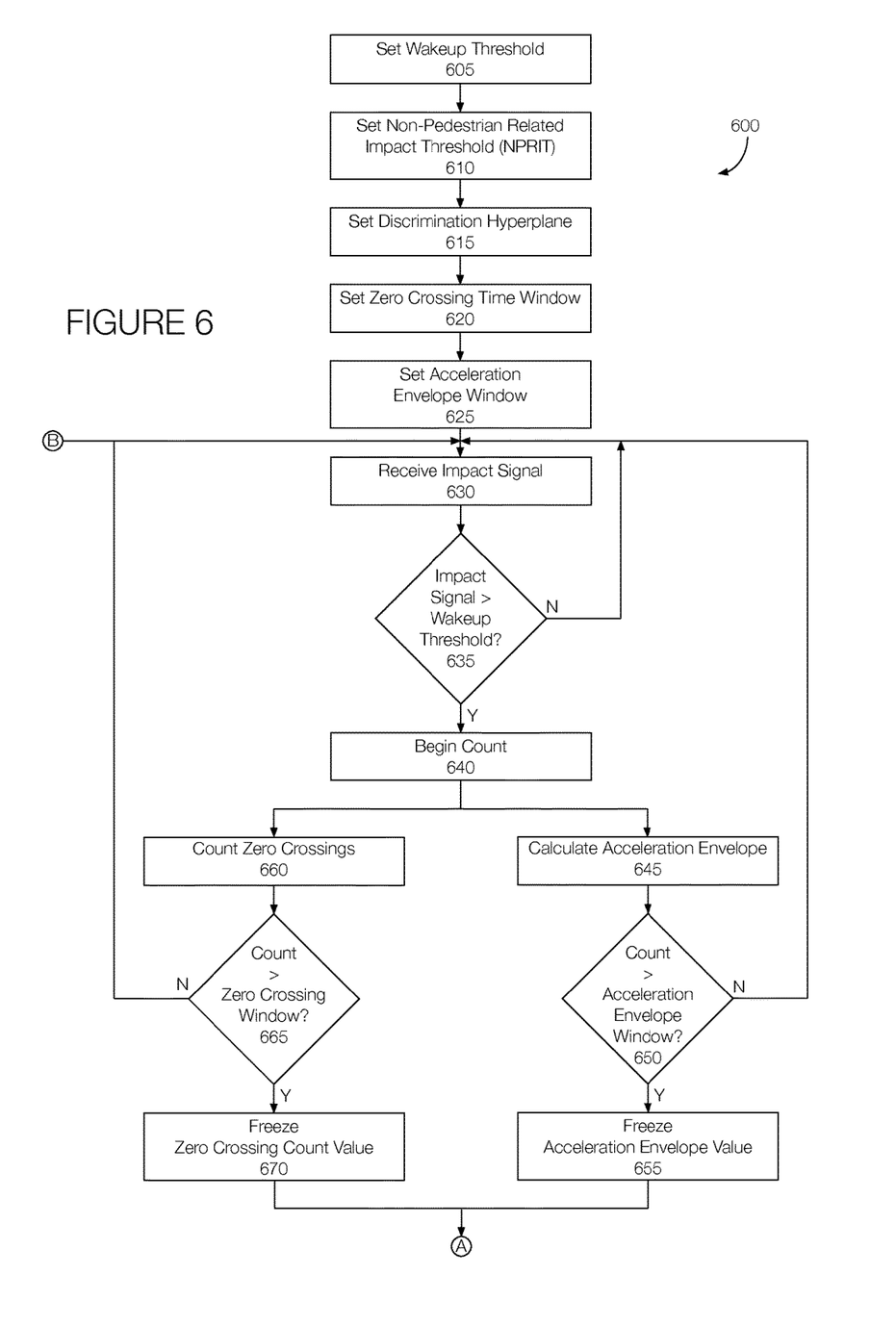
FIG. 6 is a flowchart of an example process that may be implemented by the system to detect an impact with a pedestrian and take an appropriate countermeasure.

FIG. 6 is a process flow diagram of an example process 600 that may be implemented by the detection system 110 to detect an impact and take appropriate countermeasures if the impact involves a pedestrian. The process 600 may be initiated when the host vehicle 100 is turned on and may continue to execute until the host vehicle 100 is turned off.

At block 605, the detection system 110 may set a wakeup threshold. The wakeup threshold may be set by the processing device 130 or during calibration of the detection system 110, and may be set to a value to prevent noise output by the first sensor 120 or second sensor 125 from inadvertently triggering the pedestrian protection system 105 or other countermeasures.

At block 610, the detection system 110 may set a non-pedestrian related impact threshold. The non-pedestrian related impact threshold may be based on the expected values for the impact signals during an impact that does not involve a pedestrian or a relatively small, unknown object. For example, the non-pedestrian related impact threshold may be based on expected impact signal values for an impact involving another vehicle or a larger or heavier object. The processing device 130 may set the non-pedestrian related impact threshold. Alternatively, the non-pedestrian related impact threshold may be set during calibration.

At block 615, the detection system 110 may set the discrimination hyperplane value. The discrimination hyperplane value may be based on empirical data relating the acceleration envelope of impact signals involving humans and non-human objects to the number of times the impact signals cross zero or another predetermined threshold, as shown and described with respect to FIG. 5. Setting the discrimination hyperplane may include programming the processing device 130 to use the discrimination hyperplane value as a threshold, discussed below, or having the processing device 130 select or access the discrimination hyperplane value from a table or memory device.

At block 620, the detection system 110 may set the window active duration, such as the zero crossing time window. The zero crossing time window may define the amount of time the first sensor 120 and second sensor 125 are sampled for purposes of evaluating the number of times the impact signal crosses the predetermined threshold. The zero crossing time window may be selected by the processing device 130 or may be set during calibration of the detection system 110.

At block 625, the detection system 110 may set the acceleration envelope window. The acceleration envelope window may define the amount of time the first sensor 120 and second sensor 125 are sampled for purposes of calculating the acceleration envelope of the impact signals output by the first sensor 120, the second sensor 125, or both. The acceleration envelope window may be selected by the processing device 130 or may be set during calibration of the detection system 110. Moreover, the acceleration envelope window may be the same or different from the zero crossing time window.

At block 630, the processing device 130 may receive the impact signal. As discussed above, the impact signal may represent the impact of the host vehicle 100 with an unknown object. In some instances, such as where two sensors are mounted to the bumper 115, the processing device 130 may receive the first impact signal output by the first sensor 120 and the second impact signal output by the second sensor 125.

At decision block 635, the processing device 130 may determine whether the impact signals received at block 630 exceed the system wakeup threshold. Impact signals with magnitudes below the system wakeup threshold may be discarded as noise. If the magnitude of the impact signal exceeds the system wakeup threshold, the process 600 may continue at block 640. Otherwise, the process 600 may proceed to block 630.

At block 640, the processing device 130 may begin to mark the passage of time. For example, the processing device 130 may include a counter 140 programmed to count how much time has elapsed since block 640 was most recently executed. The process 600 may continue to blocks 645 and 660 while the counter 140 is counting. Although blocks 645-670 are shown as occurring simultaneously, blocks 645-670 may alternatively occur sequentially. For instance, blocks 645-655 may be executed before blocks 660-670, or blocks 660-670 may be executed before blocks 645-655.

At block 645, the processing device 130 may calculate the acceleration envelope from the impact signal. The acceleration envelope may be defined in accordance with Equation (1), above.

At decision block 650, the processing device 130 may determine whether the count that started at block 640 is equal to or greater than the acceleration envelope window set at block 625. If so, the process 600 may continue to block 655. Otherwise, the process 600 may return to block 630, at least for purposes of continuing to calculate the acceleration envelope.

At block 655, the processing device 130 may freeze the acceleration envelope calculated during the acceleration envelope window.

At block 660, the processing device 130 may count the number of times the impact signal crosses the predetermined value, which as discussed above may be zero. For instance, the zero crossing counter 135 may count the number of times the impact signal crosses zero and output a signal representing the count.

At decision block 665, the processing device 130 may determine whether the count that started at block 640 is equal to or greater than the zero crossing time window set at block 620. If so, the process 600 may continue to block 670. Otherwise, the process 600 may return to block 630, at least for purposes of continuing to count the number of times the impact signal crosses the predetermined value.

At block 670, the processing device 130 may freeze the count determined by the zero crossing counter 135 at block 660.

At decision block 675, the detection system 110 may determine whether the impact involves an object much larger than a pedestrian. In other words, the detection system 110 may determine whether a pedestrian was likely involved in the impact. For instance, the processing device 130 may compare the acceleration envelope from block 655 to the non-pedestrian related impact threshold set at block 610. If the acceleration envelope exceeds the non-pedestrian related impact threshold, the process 600 may continue at block 690. If the acceleration envelope does not exceed the non-pedestrian related impact threshold, meaning the impact may involve a pedestrian, the process 600 may proceed to block 680.

At decision block 680, the detection system 110 may determine whether the acceleration envelope exceeds the discrimination hyperplane set at block 615. That is, the processing device 130 may compare the acceleration envelope from block 655, as a function of the count at block 670, to the discrimination hyperplane. If the acceleration envelope exceeds the discrimination hyperplane, the process 600 may continue to block 685. If the acceleration envelope does not exceed the threshold value, the process 600 may continue to block 695.

At block 685, the detection system 110 may deploy a pedestrian protection countermeasure. One way to deploy the pedestrian protection countermeasure may include the processing device 130 outputting a control signal to the pedestrian protection system 105. Upon receiving the control signal, the pedestrian protection system 105 may initiate one or more pedestrian protection countermeasures. The process 600 may end after the control signal is output, the pedestrian protection countermeasures have been deployed, or both.

At block 690, the detection system 110 may output a signal to initiate a non-pedestrian related front impact protection system. The signal may be output by the processing device 130. The process 600 may end after block 690.

At block 695, the processing device 130 may reset the counter 140 that started marking the passage of time at block 640. The process 600 may proceed to block 630 so that additional impact signals may be received and processed.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
 a sensor configured to output an impact signal that at least partially represents resonance of a metal bumper following an impact; and
 a processing device programmed to calculate an acceleration envelope from the impact signal, determine a number of times resonance of the metal bumper causes the impact signal to cross a predetermined threshold, and determine whether the impact signal represents a pedestrian impact based at least in part on the acceleration envelope and the number of times the impact signal crosses the predetermined threshold.

2. The vehicle system of claim 1, wherein the processing device is programmed to output a control signal to deploy a pedestrian protection countermeasure if the impact signal represents the pedestrian impact.

3. The vehicle system of claim 1, wherein the sensor is configured to detect an impact of a host vehicle with an object.

4. The vehicle system of claim 1, wherein the predetermined threshold is based at least in part on an impact profile of a pedestrian-related impact.

5. The vehicle system of claim 1, wherein the predetermined threshold is based at least in part on an impact profile of a non-pedestrian related impact.

6. The vehicle system of claim 1, wherein the predetermined threshold includes a zero-crossing counter to determine the number of times the impact signal crosses the predetermined threshold.

7. The vehicle system of claim 1, wherein the sensor is mounted to the metal bumper of a host vehicle.

8. The vehicle system of claim 1, the acceleration envelope and the number of zero crossings are each determined relative to a time duration.

9. The vehicle system of claim 8, wherein the time duration for calculating the acceleration envelope is different from the time duration for determining the number of zero crossings.

10. The vehicle system of claim 1, wherein the sensor is programmed to measure acceleration and wherein the impact signal represents the acceleration measured by the sensor.

11. A vehicle comprising:
a metal bumper;
a first sensor disposed on a surface of the metal bumper and configured to output a first impact signal;
a second sensor disposed on the surface of the metal bumper and configured to output a second impact signal, wherein the first and second impact signals each at least partially represent resonance of the metal bumper following an impact;
a pedestrian protection system; and
a processing device configured to receive the first impact signal and the second impact signal, wherein the processing device is programmed to calculate an acceleration envelope from the impact signal, determine a number of times resonance of the metal bumper causes the impact signal to cross a predetermined threshold, and determine whether the impact signal represents a pedestrian impact based at least in part on the acceleration envelope and the number of times the impact signal crosses the predetermined threshold.

12. The vehicle system of claim 11, wherein the processing device is programmed to output a control signal to deploy a pedestrian protection countermeasure if the impact signal represents the pedestrian impact.

13. The vehicle system of claim 11, wherein the predetermined threshold includes a zero-crossing counter to determine the number of times the impact signal crosses the predetermined threshold.

14. The vehicle system of claim 11, wherein the first sensor and second sensor are configured to detect an impact with an object and output the first impact signal and the second impact signal, respectively, in response to detecting the impact.

15. The vehicle system of claim 11, wherein the metal bumper is formed from steel.

16. A method comprising:
receiving, at a processing device, an impact signal at least partially representing resonance of a metal bumper following an impact of a host vehicle with an object;
calculating an acceleration envelope from the impact signal;
determining a number of times resonance of the metal bumper causes the impact signal to cross a predetermined threshold; and
determining whether the impact signal represents a pedestrian impact based at least in part on the acceleration envelope and the number of times the impact signal crosses the predetermined threshold
outputting a control signal to deploy a pedestrian protection countermeasure if the impact signal represents the pedestrian impact.

17. The method of claim 16, further comprising:
detecting the impact;
generating an impact signal; and
transmitting the impact signal to the processing device.

18. The method of claim 16, wherein determining the number of times the impact signal crosses the predetermined threshold includes counting the number of times the impact signal crosses a zero threshold.

19. The method of claim 16, further comprising:
setting a zero crossing time window,
wherein determining the number of times the impact signal crosses the predetermined threshold includes counting the number of times the impact signal crosses the predetermined threshold during the zero crossing time window.

* * * * *